United States Patent [19]

Snyder

[11] Patent Number: 4,848,514

[45] Date of Patent: Jul. 18, 1989

[54] SOUND ATTENUATION SYSTEM FOR JET AIRCRAFT ENGINES

[75] Inventor: Stephen Snyder, West Hills, Calif.

[73] Assignee: UAS Support, Inc., Geneva, Switzerland

[21] Appl. No.: 106,618

[22] Filed: Oct. 6, 1987

[51] Int. Cl.⁴ .............................................. E04B 1/82
[52] U.S. Cl. ..................... 181/290; 181/222; 181/286; 181/293; 428/138; 428/246; 428/251; 428/284; 428/285; 428/450; 428/458; 428/466; 428/920
[58] Field of Search ............... 428/138, 246, 251, 284, 428/285, 450, 458, 466, 920; 181/222, 286, 290, 293

[56] References Cited

U.S. PATENT DOCUMENTS

| | | | |
|---|---|---|---|
| 2,081,952 | 6/1937 | Parkinson | 181/286 |
| 2,326,763 | 8/1943 | Crandell | 181/293 |
| 2,674,335 | 4/1954 | Lemmerman | 181/222 |
| 3,542,152 | 11/1970 | Adamson et al. | 181/222 |
| 3,710,890 | 11/1973 | True et al. | 181/222 |
| 3,712,846 | 11/1973 | Daniels et al. | 428/138 |
| 3,748,213 | 7/1973 | Kitching et al. | 428/138 |
| 4,130,175 | 12/1978 | Hehmann | 181/290 |
| 4,137,992 | 2/1979 | Herman | 181/293 |
| 4,441,578 | 4/1984 | Rose | 181/290 |
| 4,567,092 | 1/1986 | Catrain et al. | 428/286 |

FOREIGN PATENT DOCUMENTS 0984817  3/1965  United Kingdom ................ 181/222

OTHER PUBLICATIONS

J. Woodall, "Quieting the JT3D Powered 707", *Sound and Vibration*, vol. 8, No. 2, pp. 20-25, Feb. 1974.

*Primary Examiner*—L. Dewayne Rutledge
*Assistant Examiner*—David W. Schumaker
*Attorney, Agent, or Firm*—Kenyon & Kenyon

[57] ABSTRACT

The present invention relates to a novel sound attenuating system. More particularly, the invention relates to a simpler, lighter, and more effective noise attenuating laminate which is made up of five specific layers of material. The laminate includes a duct liner, a moisture barrier, a fire barrier, acoustic attenuating material, and a solid backing sheet. The laminate is readily inserted into various sections of a jet engine compartment in order to attenuate the sound produced by the jet engine. Hollow rivets are used to conduct acoustical energy to the noise attenuating laminate. This novel means for conducting the acoustical energy to the laminate of the jet engine compartment allows for an improved anti-icing system, for more efficient jet engine operation, and for more efficient dissipation of acoustic energy.

11 Claims, 2 Drawing Sheets

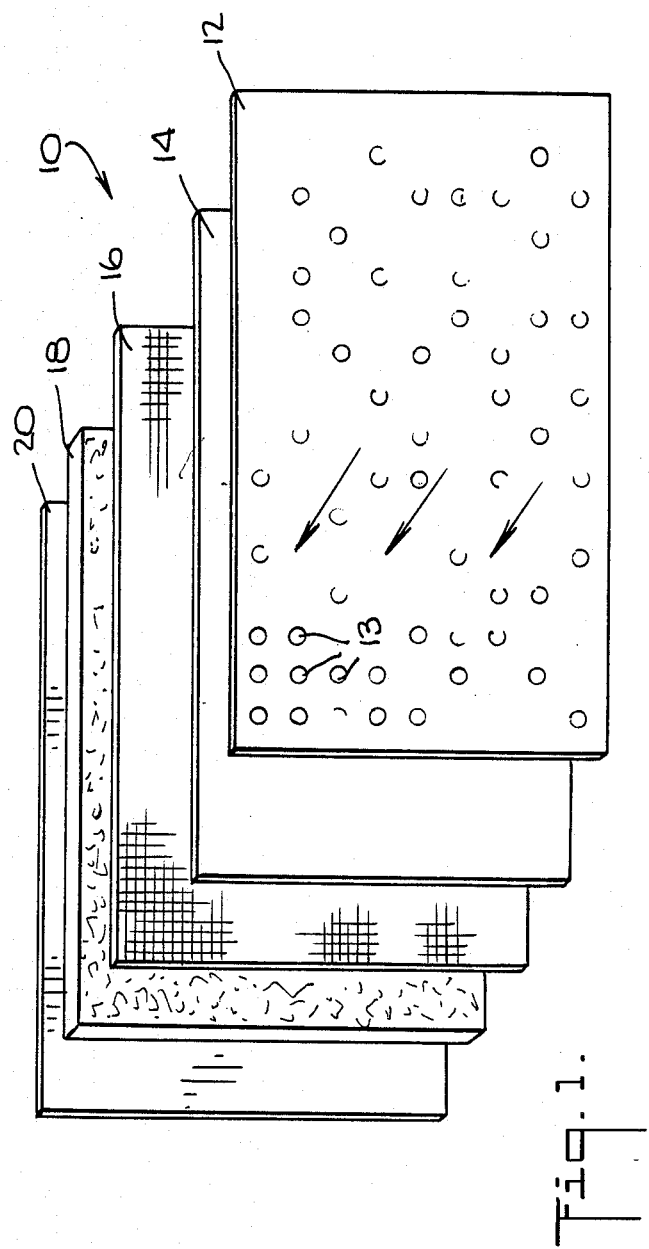
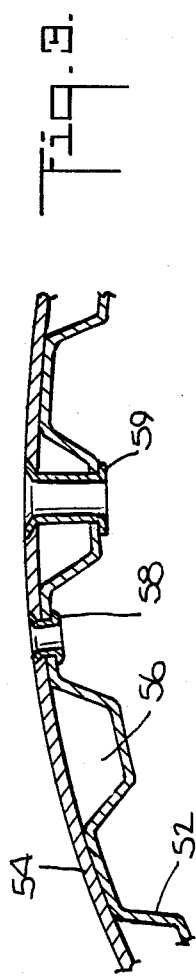
Fig. 1.
Fig. 3.

SOUND ATTENUATION SYSTEM FOR JET AIRCRAFT ENGINES

The present invention relates to the field of sound attenuation, and more particularly to a sound attenuation system which can be used for the suppression of sound produced by jet aircraft engines.

BACKGROUND OF THE INVENTION

The method presently in use for attenuating noise generated by the commercial jet aircraft engines was initially developed in the late 1960's and early 1970's by the manufacturers of such aircraft. This technology consists of an acoustic lining system for the engine, having a sandwich-type construction consisting of sintered metal mesh facing the engine air flow paths in the inlet and fan exit ducts. This mesh is bonded to the duct liner skin with a precisely sized and spaced hole pattern tuned to the primary noise frequency generated in that portion of the engine at the critical operating mode being silenced. The metal mesh and perforated duct liner skin are bonded to a honeycomb structure backed with a solid skin.

At the time this system was developed, the industry objective was to meet the requirements of Federal Air Regulation Part 36, Stage 2. This system remains the primary industry development for attenuating the noise generated by narrow-bodied jets, as it has been perceived as the only system adequate for service in its unique operating environment in the jet engine. For example, JT3D commercial jet engines installed on 707 and DC8 aircraft have used and continue to use this system.

Sound attenuation with this system is accomplished by the Helmholz Resonator effect whereby cavities in the honeycomb dissipate acoustical energy after its admittance through the metal mesh and perforated skin which has been placed between the honeycomb and the sound generating elements of the engine. The solid skin backing in the honeycomb is impervious to acoustical energy radiation and prevents acoustical transmission. Some structure-borne sound transmission is transmitted by the sandwich construction, but this is of a secondary nature. Loss in engine performance, however, has been associated with air leakage through the honeycomb lining.

The noise generated by the fan section of jet engines occurs at discrete primary frequencies which vary depending on engine model, fan speed, and location along the duct. Attenuation of such noise using the above mentioned method has the potential to achieve the initial goal of and compliance with Stage 2 of the Federal Air Regulations, Part 36. Therefore, industry research has concentrated on the precise tuning of the lining design to the engine noise source characteristics, with emphasis on acoustic parameters of different dimensional and material properties of the porous metal facing sheet, honeycomb core, and the solid backing sheet. Results have been barely adequate with differing degrees of economic and operational penalties.

The system described above is estimated to be capable of producing an attenuation of 6 to 11 DB and requires the meticulous fine tuning of critical parameters such as skin hole size, metal mesh grid and thickness, honeycomb material makeup, and cavity dimension and thickness. This system is designed to attenuate only one primary frequency for a given combination of critical parameters. The result has been marginal compliance with the Stage 2 requirements of Federal Air Regulations, Part 36. Moreover, Stage 3 requirements have not yet been reached with the present system without resort to measures which result in a high cost and high risk solution to the noise problem and a significant engine performance penalty, exposure to catastrophic engine failure, and continuing maintenance problems. A further problem with such measures would involve obtaining airframe and engine manufacturer approval for the attendant inlet airflow changes.

SUMMARY OF THE INVENTION

It is, therefore, an object of this invention to provide a straightforward, well-constructed noise attenuation system for various jet aircraft engines which allows for more efficient attenuation of sound energy.

It is a further object of this invention to provide a noise attenuation system for jet aircraft engines which would comply with Stage 3 of the Federal Air Regulations, Part 36 noise attenuation requirements with minimal economic and operational penalties It is yet a further object of this invention to provide a sound attenuation system which would achieve nonlinear acoustic attenuation over a broad range of noise frequencies without the need for any fine tuning requirements.

It is another object of this invention to provide for a sound attenuation system which would prevent loss of engine performance associated with air leakage.

It is still another object of this invention to provide for a novel installation of a sound attenuation system affixed to jet aircraft engines which allows for increased engine thrust and improved fuel efficiency due to an improved anti-icing system.

The objects of this invention are accomplished by providing a sound attenuating laminate which consists of a number of layers. The first layer is a fan inlet duct and center body liner, fan exhaust duct inner and outer liner and liner for the large engine access doors. These liners are perforated to allow for the entry of acoustic energy. The second layer is a moisture barrier which is located next to the perforated liner. The third layer is made up of fire resistant ceramic fabric which may be bonded to the moisture barrier. The fourth layer consists of acoustic attenuating material which may in turn be bonded to the fire resistant fabric. The fifth and last layer is a solid backing sheet which may be bonded to the acoustic attenuating material. The resulting laminate is then used to line certain portions of the jet engine inlet and fan exhaust components.

Furthermore, hollow rivets will be utilized to replace certain solid structural rivets at certain locations of the jet engine, most particularly the inlet duct. These hollow rivets will penetrate anti-icing airflow channels to achieve an improved anti-icing system and allow for the passage of acoustic energy radiation from its origin, through the duct liner to the acoustic attenuating material.

BRIEF DESCRIPTION OF THE DRAWINGS

FIG. 1 is a schematic diagram showing the five layers making up an embodiment of the sound attenuation system described in the present invention;

FIG. 3 is a diagram showing the use of hollow rivets to allow for the passage of acoustical energy.

DETAILED DESCRIPTION OF A PREFERRED EMBODIMENT

Figure 2:
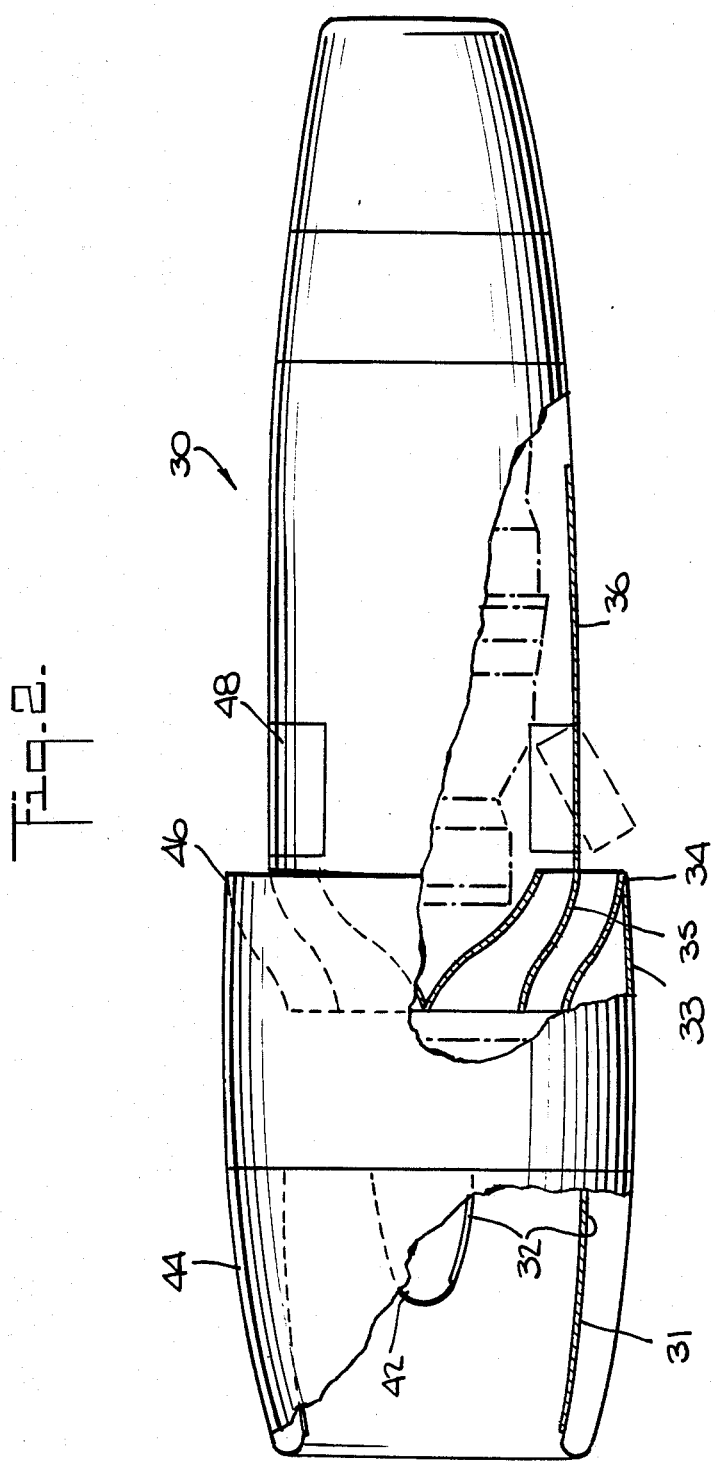
FIG. 2 is a diagram showing a jet engine nacelle indicating where the sound attenuation laminate described in this invention would be placed within such a jet engine nacelle.

Referring specifically to the drawings, FIG. 1 illustrates one embodiment 10 of the present invention. According to this invention, the sound attenuating laminate has five specific layers, as can be seen in FIG. 1. The first layer 12 is a fan inlet duct, center body, fan exhaust duct, and access door liner. This liner carries perforations 13 that allow for the entry of acoustic energy. Such perforations are preferably about one-tenth of an inch in diameter and spaced at approximately one-tenth of an inch intervals along the liner.

The second layer 14 of the sound attenuating laminate is composed of a moisture barrier. This moisture barrier is adjacent to the liner layer. A suitable moisture barrier was found to be sheet made of poly(ethylene terephthalate)e, e.g. MYLAR®, a registered trademark of the E.I. DuPont De Nemours and Company, Wilmington, Del., neoprene rubber or silicone rubber. The third layer 16 of the sound attenuating laminate is composed of a fire barrier. This fire barrier is adjacent to the preceeding moisture barrier and serves to protect the sound attenuating material and external aircraft structure from fire hazards. A suitable fire barrier was found to be Nextel 312 Woven Fabric, manufactured by the Ceramic Materials Department of the 3M Corporation, Building 225-4N-07, 3M Center, St. Paul, Minn. 55144-1000.

The fourth layer 18 of the sound attenuating system is made up of acoustic attenuating material. This material is formed in a blanket type configuration, preferably two inches thick and is adjacent to the preceeding fire barrier. The blanket of such material serves to attenuate the sound produced by the aircraft jet engine. One suitable sound attenuating material was found to be Kaowool ceramic fiber blanketing, manufactured by the Insulating Products Division of Babcock and Wilcox, a McDermott company. Another suitable acoustic attenuating material was found to be 1000 Series Spin-Glas Fiber Glass Insulation, manufactured by the Manville Building Materials Corporation, a subsidiary of the Manville Corporation, Ken-Caryl Ranch, P.O. Box 5108, Denver, Colo. 80217. As discussed below, such materials are appropriate for use in different portions of the engine.

The fifth layer 20 of this sound attenuating system is a solid backing sheet. This backing sheet may be bonded to the preceeding acoustic attenuating material. Suitable backing materials were found to be aluminum or fiberglass.

This laminate is used to line various portions of the jet engine compartment. FIG. 2 shows a typical jet engine nacelle 30, such as that used to house the commercial model JT3D jet engine. Shaded areas 31–36 show the application of the laminate of the present invention. Primary areas for application include the fan inlet duct 44, the nose dome 42, the fan exhaust ducts 46 and access doors to the nacelle extending rearward from the fan exhaust thrust reversers 48.

In the more forward areas of the engine, it is preferred to employ a fiberglass material as the acoustic absorbent layer 18, (e.g., areas 31, 32), while in more rearward areas, such as areas 34, 35 and 36, it is preferred to use the ceramic fiber material. The fiber glass material is a superior sound attenuation material which is substantially lighter in weight. The ceramic fiber material is used adjacent to hot areas of the engine as it will withstand temperatures in excess of 2000° F.

The acoustic laminate of the invention is installed between the existing air flow liner and the solid backing sheet in all areas except the access doors. The solid backing sheet is mechanically fastened with rivets and/or threaded fasteners to adjacent structures. The inner surface of the access door outer skin serves as the backing sheet in that location. A perforated sheet of aluminum or stainless steel will face the engine with the attenuation laminate being placed between the perforated sheet and the inner surface of the outer skin. The perforated sheet will be mechanically fastened to the adjacent structure of the door.

The fan inlet duct area are equipped with anti-icing systems, consisting of channels in the underside of each such structure through which hot air flows during anti-icing system operation. Such channels are composed of corrugations formed by the riveting of an inner liner to the inner wall of the fan duct inlet. This inner liner has been upset to form corrugated channels on the back surface of the inlet liner. When installing the laminate of the present invention, the existing solid rivets will be replaced with hollow rivets, as shown in FIG. 3. As seen there, the anti-icing channels 56 are formed by corrugated sheet 52 abutting a wall 54, which could be the wall of the fan inlet duct. Conventionally, rivets have been placed at positions such as 58, where the corrugated sheet makes contact with the wall. In the present invention, however, no only are the rivets 58 replaced by hollow rivets, but also additional hollow rivets 59 are inserted through channels 56. These rivets act as a means for providing conduits in the duct liner for the passage of acoustic energy to the sound absorbent layer in the laminate, which is located between the duct liner and the outer cowl skin.

Thus, the hollow rivets will serve as a novel means for conducting acoustic energy generated by the jet engine through the wall of the fan duct or nose dome to the sound attenuating laminate. These hollow rivets will therefore serve as acoustic horns which will not only strengthen the anti-icing duct nacelle through structural support, but also will act as efficient and easily installed conduits for acoustic energy.

The duct liner and an inner liner will be riveted together to form a structurally stiff corrugated structure. This structure will also form the air flow passages for the low of hot anti-icing air from the cowling inlet lip along the length of the inlet duct.

The hollow rivets which penetrate the anti-icing air passages may be sleeved in order to prevent collapse of the air passages from rivet upset forces. The hollow rivets (either sleeved or unsleeved) will function primarily for the passage of acoustic energy radiation. The rivets will also intersect the air flow passage at a right angle to the flow, and thus will also function as heat exchange baffles to improve the efficiency of the anti-icing systems of the inlet duct.

Efficiency of the jet engine anti-icing system will be improved in two ways. First, the hot air impinging on the outer sleeve of the hollow rivet will readily transmit heat to the duct liner skin on outer skin. Second, the hollow rivets penetrating the anti-icing air passages will slow air flow through the passages, thus allowing for the transfer of more of the heat content of the hot air to the metal surfaces. The improvement in the anti-icing system efficiency will allow the jet engine anti-icing system to operate at reduced amounts of hot anti-icing bleed air, thus reducing the amount of engine air bled off for this purpose. Engine thrust will therefore be increased and fuel efficiency improved during anti-icing system operation.

The nose dome 42 of the engine has inserts attached to the dome's inner surface forming anti-icing air flow channels. These channels are believed to be redundant to the satisfactory anti-icing of the nose dome and will be eliminated from the present design. The mid-section 32 of the nose dome will be perforated to allow passage of acoustic energy to the sound attenuation material installed in the center of the dome's mid-section The sound attenuation system of this design has been demonstrated to attenuate a broad range of noise frequencies without special fine tuning. It is estimated that attenuations of up to 23 DB may be possible based on previous experimental work. Furthermore, this system meets the primary requirements for fire and heat resistance imposed by the Federal Aviation Administration. This laminate system will be sealed from the engine air flow using the moisture barrier lamination to prevent the 2% loss in engine performance associated with the older sandwich type construction. The sealed system will be sealed from moisture and liquids, another significant problem inherent with the older sandwich-type construction.

In the foregoing specification, the invention has been described with reference to a specific exemplary embodiment thereof. It will, however, be evident that various modifications and changes may be made thereunto without departing from the broad spirit and scope of the invention as set forth in the appended claims. The specification and drawings are accordingly to be regarded in an illustrative rather than in a restrictive sense.

What is claimed is:

1. A multi-layered laminated material having improved sound energy attenuating and flame retardant properties comprising:
   a perforated facing layer;
   a moisture barrier layer directly adjacent to said facing layer;
   a fire resistant layer directly adjacent to said moisture barrier layer;
   an acoustic attenuating material layer directly adjacent to said fire resistant layer;
   a solid backing sheet layer directly adjacent to said acousting attenuating material layer; and
   said multi-layered laminated material having no internal means of support.

2. The article of claim 1, wherein said moisture barrier is composed of neoprene rubber.

3. The article of claim 1, wherein said moisture barrier is composed of silicone rubber.

4. The article of claim 1, wherein said moisture barrier is composed of poly(ethylene terephthalate) sheet.

5. The article of claim 1, wherein said fire resistant layer is composed of woven ceramic fabric.

6. The article of claim 1, wherein said acoustic attenuating material is composed of ceramic fiber blanketing 7. The article of claim 1, wherein said acoustic attenuating material is composed of fiber glass blanketing.

8. The article of claim 1, wherein said solid backing sheet is composed of aluminum.

9. The article of claim 1, wherein said solid backing sheet is composed of fiber glass.

10. The article of claim 1, wherein the facing layer is aluminum.

11. The article of claim 1, wherein the facing layer is stainless steel.

* * * * *